United States Patent [19]
Vortmeyer

[11] Patent Number: 5,351,572
[45] Date of Patent: Oct. 4, 1994

[54] ADJUSTING DRIVE FOR AXIALLY ADJUSTABLE STEERING COLUMNS IN MOTOR VEHICLES

[75] Inventor: Jens Vortmeyer, Preus.-Oldendorf, Fed. Rep. of Germany

[73] Assignee: Lemforder Metallwaren AG, Lemforde, Fed. Rep. of Germany

[21] Appl. No.: 19,020

[22] Filed: Feb. 18, 1993

[30] Foreign Application Priority Data

Feb. 28, 1992 [DE] Fed. Rep. of Germany ....... 4206176

[51] Int. Cl.⁵ .................... B62D 1/18; F16H 29/00
[52] U.S. Cl. ................. 74/493; 74/122; 74/422; 280/775
[58] Field of Search .............. 74/116, 119, 120, 121, 74/122, 493, 422; 280/775

[56] References Cited

U.S. PATENT DOCUMENTS

| | | | |
|---|---|---|---|
| 2,836,988 | 6/1958 | Cashman | 74/493 |
| 5,027,674 | 7/1991 | Nolte et al. | 74/493 |
| 5,029,489 | 7/1991 | Burmeister et al. | 74/493 |
| 5,187,994 | 2/1993 | Hirai et al. | 74/122 X |
| 5,193,848 | 3/1993 | Faulstroh | 74/493 X |

FOREIGN PATENT DOCUMENTS

| | | |
|---|---|---|
| 3318935C1 | 5/1983 | Fed. Rep. of Germany . |
| 3618266 | 10/1987 | Fed. Rep. of Germany . |
| 3808270 | 9/1989 | Fed. Rep. of Germany ........ 74/443 |
| 1331716 | 8/1987 | U.S.S.R. ................................ 74/493 |
| 2054794 | 2/1981 | United Kingdom ................. 74/120 |

*Primary Examiner*—Leslie A. Braun
*Assistant Examiner*—David W. Laub
*Attorney, Agent, or Firm*—McGlew and Tuttle

[57] ABSTRACT

The adjusting drive for axially adjustable steering columns in motor vehicles has a transmission between a drive unit mounted to rotate in a housing (2) secured to the body and a steering column tube (1) mounted to move axially in the housing. Gearing (5) is provided on the steering column tube extending in the axial direction. Gearing (8.1, 9.1) of the transmission engages with the steering column tube gearing. The gearing is provided as cycloidal gearing on two toothed racks (8, 9) whose gearing engages in the gearing on the steering column tube (1) out of phase with one another by half a tooth spacing, and which are movable eccentrically by the drive unit by a cam bearing (16, 17) out of phase by 180°.

10 Claims, 3 Drawing Sheets

ADJUSTING DRIVE FOR AXIALLY ADJUSTABLE STEERING COLUMNS IN MOTOR VEHICLES

FIELD OF THE INVENTION

This invention relates to an adjusting drive for axially adjustable steering columns in motor vehicles in which there is a transmission between a drive unit mounted to rotate in the housing secured to the body and a steering wheel column mounted to shift axially in the housing, the steering column having gearing extending in an axial direction in which gearing of the transmission is engaged, an upper part of a telescoping steering shaft being connected to the steering wheel at its upper end and being mounted to rotate in the steering column tube.

BACKGROUND OF THE INVENTION

Such an adjusting drive is disclosed by DE 33 18 935 -C1-. The transmission for coupling the drive unit driven by an electric motor to the steering column tube has a metallic worm gear that engages in globoidal worm gearing on the steering column tube, which is also made of metal, so that the steering column tube can be adjusted in both axial directions relative to the housing by an electric motor which is reversible in direction of rotation. Such a transmission is self-locking and therefore avoids additional locking elements for fastening in the set position. To minimize play in the gearing and transmission, the worm gear is mounted to pivot around a shaft running parallel to the longitudinal axis of the gearing on the steering column tube and is loaded by a spring against the gearing on the steering column tube. Instead of such a spring, a hand-operated eccentric adjusting device can also be used.

Adjusting drives of the usual design require an undesirable increase of weight with the adverse consequences resulting from this, especially in case of a frontal collision of the vehicle.

SUMMARY AND OBJECTS OF THE INVENTION

It is the an object of this invention to improve an adjusting drive of the type mentioned initially with regard to absorbing axially active forces, and thereby to make it possible to manufacture a transmission clutch permanently free of play from plastic parts between the drive and a steering column tube, which may likewise be made of plastic.

According to the invention, an adjustable drive for an axially adjustable steering column for motor vehicles is provided including a transmission between a drive unit and a steering column tube mounted to shift axially in the housing. The drive unit is mounted to rotate in a housing secured to the motor vehicle body. The steering column tube has gearing extending in an axial direction. An upper part of a telescoping steering shaft is connected to the steering wheel at its upper end and is mounted to rotate in the steering column tube. The transmission is formed with a cycloidal gearing with toothed racks, each toothed rack having gearing engaging the gearing on the steering column. The gearing on the toothed racks is out of phase by one half of a tooth spacing and the racks are movable eccentrically 180° out of phase by the drive unit via an eccentric gearing.

Engagement of as many teeth as desired can be produced by using cycloidal gearing, with the use of two toothed racks making it possible for the teeth of one toothed rack to be fully engaged over its entire length even when the other toothed rack is lifted out of the gearing on the steering column tube. The rotary motion of the drive unit is converted into translational motion for the axial adjustment of the steering column tube by an eccentric arrangement in which the two toothed racks are movable 180° out of phase with one another on an eccentric path whose major axis matches the tooth spacing and whose minor axis matches the tooth depth. During the transmission of adjusting forces, and in the same way during the transmission of axial forces that become active in a front-end collision of the vehicle, both of the toothed racks are loaded only in the longitudinal direction, so that the transmission of forces is essentially optimized. This makes it possible to manufacture all of the components of a nonmetallic, inelastic material with a specific gravity lower than that of metal, particularly plastic. This results in a substantial weight reduction of the steering column at its upper end, and a reduction of the adjustment forces to be applied, so that motorized drives are also of correspondingly smaller design and contribute to a further weight reduction. All of the components are simple to produce and can be injection molded of suitable plastics, for example. Smooth running can be promoted by the choice of suitable plastics.

A very substantial advantage lies in the fact that the wavy drive unit no longer absolutely has to be coupled rigidly to the shaft of an electric motor, so that this connection optionally consists of a flexible shaft or the like and the electric motor can be fastened at a remote location in the motor vehicle, as is disclosed in principle, for example, in DE 36 18 266 -C1-.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
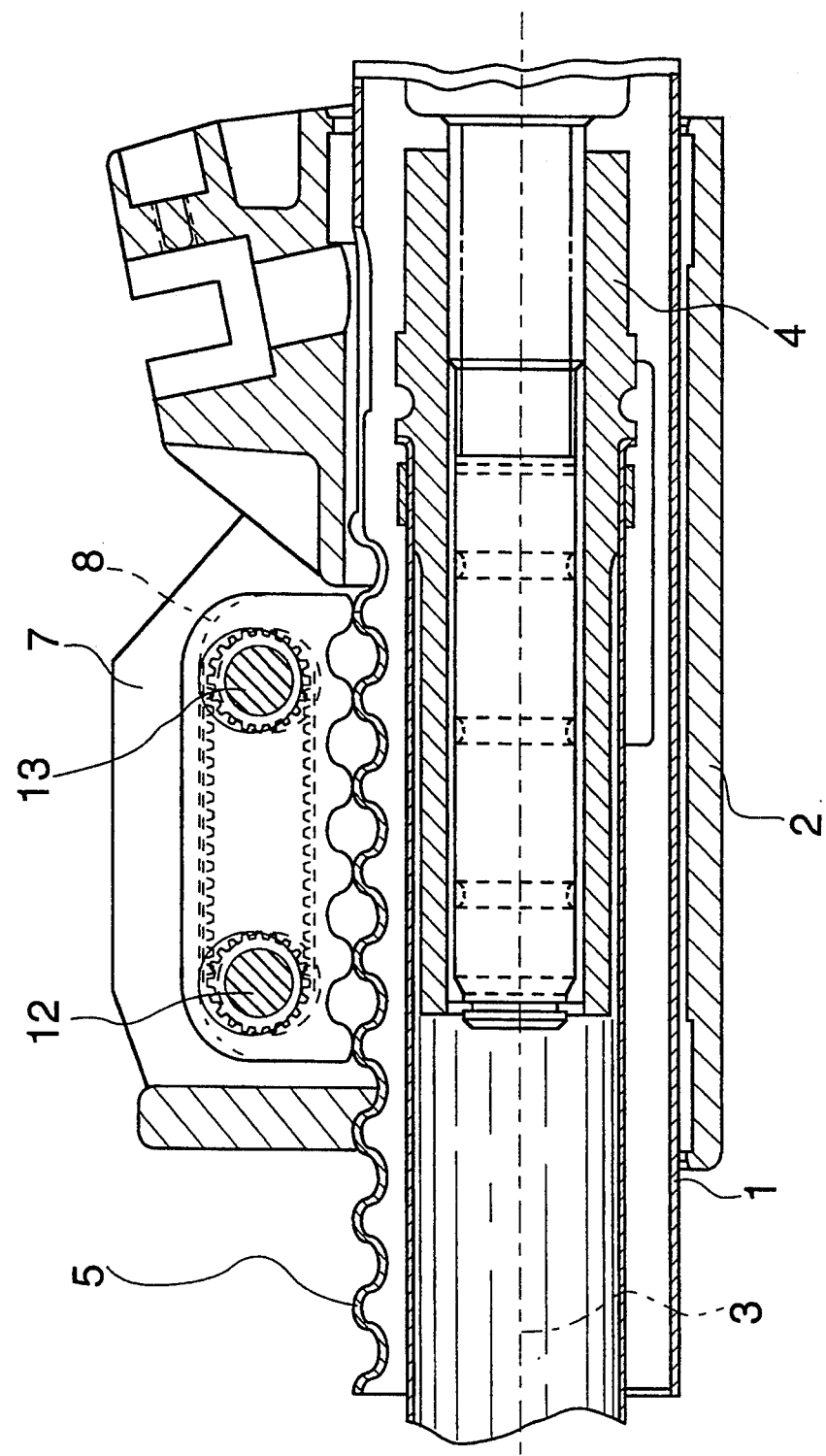
FIG. 1 is a longitudinal sectional view taken through an adjusting drive in an axial plane.

The steering column tube 1 can be moved along its longitudinal axis 3 in a housing 2 secured to the body. The upper part of the telescoping steering shaft 4 is mounted to rotate in the steering column tube 1 so that it is adjustable in the axial direction together with the steering column tube 1. The steering wheel 20 of the motor vehicle 50 is fastened to the upper end of the steering shaft 4.

Cycloidal gearing 5 extending in the direction of the longitudinal axis 3 is machined on the outer circumference of the steering column tube 1 for the adjusting drive, at least in an area corresponding to the length of adjustment. This gearing 5 can be miffed, stamped, molded during manufacture, or formed in any suitable way adapted to the material of the steering column tube 1. In a cutout in the housing in front of this gearing 5, between two walls 7 of the housing 2 parallel to one another, there are two toothed racks 8 and 9 parallel to one another and parallel to the gearing 5 on the steering column tube 1. Cycloidal gearing 8.1, 9.1, provided on racks 8, 9 respectively, is likewise machined, to engage in the gearing 5 on the steering column tube 1 out of phase by half a tooth spacing. This produces an ordinary or common cycloidal gearing. Each of the two toothed racks 8 and 9 has two passage holes 10 and 11 at the same height, and is mounted eccentrically on a shaft 12 or 13 that passes through them, with these shafts 12 and 13, on the other hand, being mounted to rotate in holes 14 and 15 in the wall 7 defining the cutout in the housing.

Figure 2:
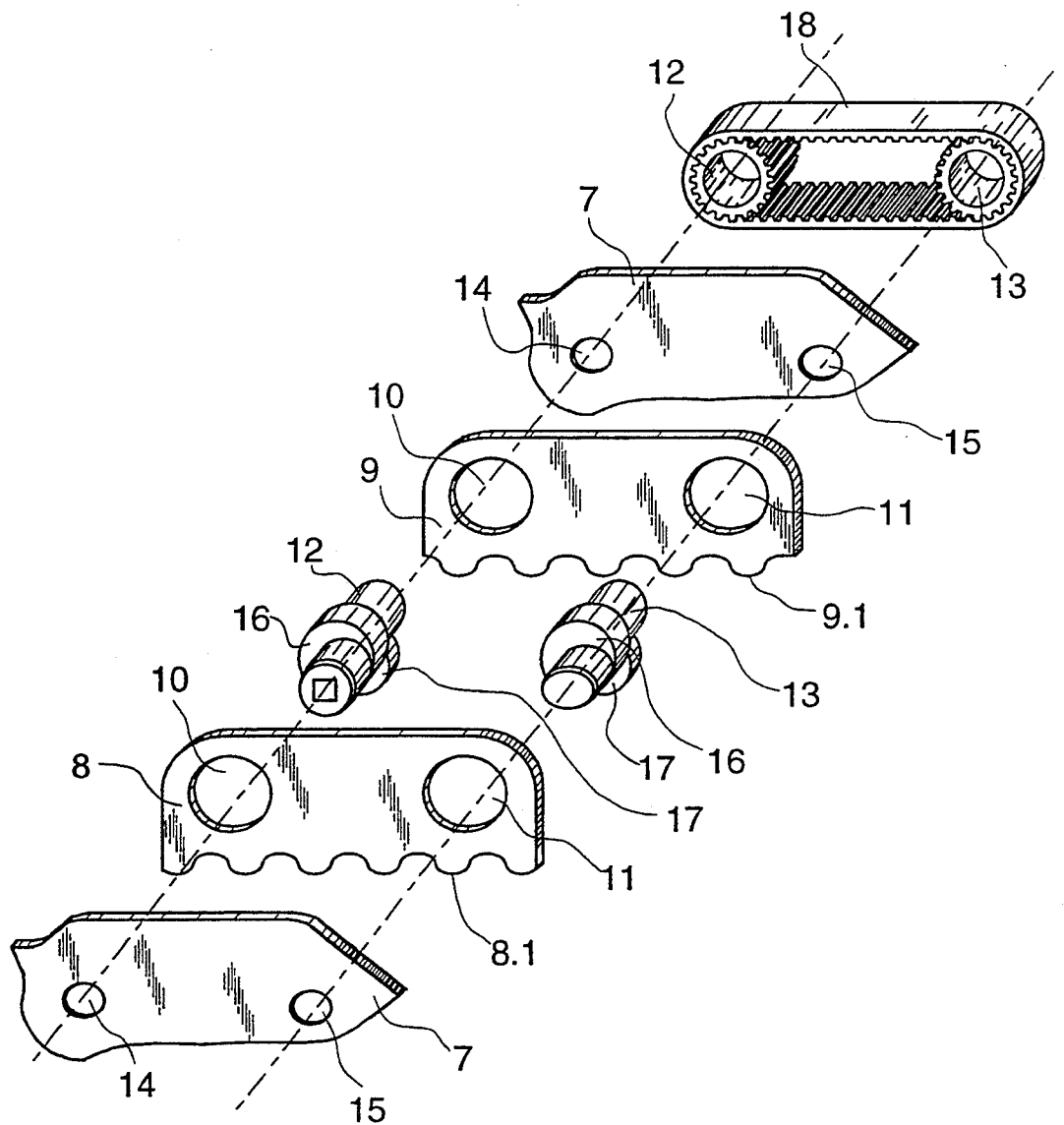
FIG. 2 is the parts of the adjusting drive in an exploded view, and FIG. 3 a side view of the adjusting drive mounted in a motor vehicle.
Figure 3:
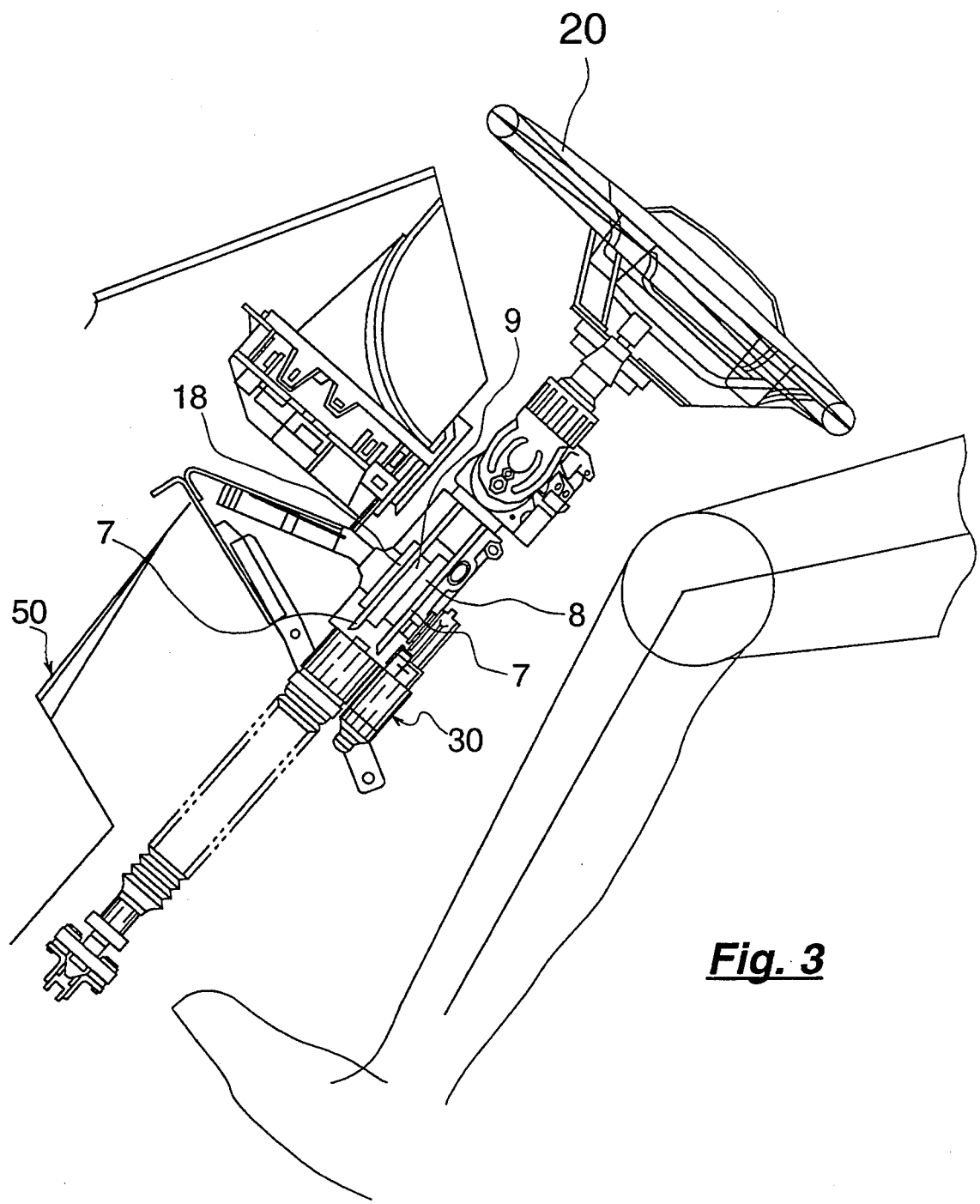

The eccentric arrangement is formed by two cams 16 and 17 machined with a phase displacement of 180° onto each shaft 12 and 13, which rotate in the holes 10 and 11 in the two toothed racks 8 and 9. The two cams 16 and 17 matched in phase operate in the holes 10 and 11 of the one toothed rack 8, and the two cams 17 displaced from them by 180° operate in the holes 10 and 11 in the toothed rack 9. The two shafts 12 and 13 are connected to one another by a toothed belt 18 and thus constitute a common drive unit for the adjusting drive, so that only one shaft 12 or 13 is to be operated by hand or by means of a drive motor 30. All of the components illustrated in FIG. 2 can be manufactured economically of a suitable plastic. For the length adjustment of the steering column tube 1 in the housing, the drive unit turns in one direction or the other so that the toothed racks 8 and 9 out of phase by 180° also move their teeth on an elliptical path. The major axis of this elliptical path matches the tooth spacing and the minor axis matches the tooth depth, so that tooth flank contact is constantly maintained in the looping motion of the toothed racks 8 and 9 over their entire length because of the cycloidal gearing chosen, and the axial forces with maximum action in the direction of the longitudinal axis 3 are distributed uniformly over all of the teeth of at least one toothed rack 8 or 9.

While a specific embodiment of the invention has been shown and described in detail to illustrate the application of the principles of the invention, it will be understood that the invention may be embodied otherwise without departing from such principles.

What is claimed is:

1. An adjusting drive for an axially adjustable steering column, comprising:

a housing secured to a motor vehicle;

a drive unit mounted to rotate in said housing;

a steering column tube mounted to shift axially in said housing, said steering column tube having gearing extending in an axial direction;

a telescoping steering shaft having an upper part connected to a steering wheel, said telescoping steering shaft being mounted to rotate in said steering column tube: and transmission means connecting said drive unit and said gearing extending in an axial direction, said gearing extending in an axial direction being cycloidal gearing, said transmission means including two toothed racks having gearing engaging said cycloidal gearing on said steering column tube, said gearing of said two toothed racks being out of phase by one half of one toothed spacing and including eccentric bearings supporting said toothed racks for eccentric movement 180° out of phase.

2. An adjusting drive according to claim 1, wherein said toothed racks are mounted parallel to one another on said eccentric bearings, said eccentric bearings being mounted on a drive shaft, said eccentric bearings being 180° out of phase with one another.

3. An adjusting drive according to claim 1, wherein: said toothed racks are each mounted to a first of said eccentric bearings and a second of said eccentric bearings synchronously driven by drive shafts.

4. An adjusting drive according to claim 2, wherein: each of said toothed racks is mounted on a first and second cam of synchronously driven drive shafts.

5. An adjusting drive according to claim 3, wherein: said two drive shafts are connected to one another by a positive transmission belt and are connected in common to said drive unit.

6. An adjusting drive for an axially adjustable steering column, comprising:

a housing secured to a motor vehicle;

a drive unit mounted to rotate in said housing;

a steering column tube mounted to shift axially in said housing, said steering column tube having gearing extending in an axial direction; and transmission means connecting said rod unit and said gearing extending in an axial direction, said gearing extending in an axial direction being cycloidal gearing, said transmission means including two toothed racks having gearing engaging said cycloidal gearing, said gearing for two toothed racks being out of phase by one half of one toothed spacing and including eccentric bearings supporting said toothed racks for eccentric movement 180° out of phase.

7. An adjusting drive according to claim 6, wherein: said toothed racks are mounted parallel to one another on said eccentric bearings, said eccentric bearings being mounted on a drive shaft, said eccentric bearings being 180° out of phase with one another.

8. An adjusting drive according to claim 6, wherein: said toothed racks are each mounted to a first of said eccentric bearings and a second of said eccentric bearings, synchronously driven by drive shafts.

9. An adjusting drive according to claim 7, wherein: each of said toothed racks is mounted on a first and a second eccentric bearing connected to synchronously driven drive shafts.

10. An adjusting drive according to claim 8, wherein: said two drive shafts are connected to one another by a positive transmission belt, connected in common to said drive unit.

* * * * *